US010699017B2

(12) United States Patent
Mendelev et al.

(10) Patent No.: US 10,699,017 B2
(45) Date of Patent: Jun. 30, 2020

(54) DETERMINING COVERAGE OF DYNAMIC SECURITY SCANS USING RUNTIME AND STATIC CODE ANALYSES

(71) Applicant: HEWLETT-PACKARD DEVELOPMENT COMPANY, L.P., Houston, TX (US)

(72) Inventors: Kirill Mendelev, Alpharetta, GA (US); Lu Zhao, Sunnyvale, CA (US); David John Babcock, Sunnyvale, CA (US); Ronald Joseph Sechman, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 961 days.

(21) Appl. No.: 14/764,280

(22) PCT Filed: Feb. 28, 2013

(86) PCT No.: PCT/US2013/028403
§ 371 (c)(1),
(2) Date: Jul. 29, 2015

(87) PCT Pub. No.: WO2014/133528
PCT Pub. Date: Sep. 4, 2014

(65) Prior Publication Data
US 2015/0371047 A1 Dec. 24, 2015

(51) Int. Cl.
*G06F 21/00* (2013.01)
*G06F 21/57* (2013.01)
(Continued)

(52) U.S. Cl.
CPC ........ *G06F 21/577* (2013.01); *G06F 11/3668* (2013.01); *G06F 21/563* (2013.01);
(Continued)

(58) Field of Classification Search
CPC .... G06F 21/577; G06F 21/563; G06F 21/566; G06F 2221/033; H04L 63/1433
See application file for complete search history.

(56) References Cited

U.S. PATENT DOCUMENTS 6,959,431 B1    10/2005  Shiels et al.
8,141,158 B2    3/2012   Calendino et al.
(Continued)

FOREIGN PATENT DOCUMENTS

CN    101714118    5/2010
CN    101894230    11/2010
(Continued)

OTHER PUBLICATIONS

Extended European Search Report, EP Application No. 13876193.7, dated Sep. 19, 2016, pp. 1-11, EPO.
(Continued)

*Primary Examiner* — Jeffrey C Pwu
*Assistant Examiner* — Helai Salehi

(57) ABSTRACT

Example embodiments relate to assessing dynamic security scans using runtime analysis and static code analysis. In example embodiments, a system performs static code analysis of a web application to identify reachable code and/or data entry points, where the data entry points are used to determine an attack surface size for the web application. At this stage, the system may initiate runtime monitoring for a dynamic security scan of the web application, where the runtime monitoring detects invocation of a statement at one of the data entry points. The invocation is logged as an invocation entry that comprises invocation parameters and/or code units that were executed in response to the invocation. The system may then determine an attack surface coverage of the dynamic security scan using the invocation
(Continued)

entry and the attack surface size and/or a reachable code coverage using the invocation entry and the reachable code.

17 Claims, 5 Drawing Sheets

(51) Int. Cl.
  *G06F 21/56* (2013.01)
  *G06F 11/36* (2006.01)
  *H04L 29/06* (2006.01)

(52) U.S. Cl.
  CPC .......... *G06F 21/564* (2013.01); *G06F 21/566* (2013.01); *H04L 63/1433* (2013.01); *G06F 2221/033* (2013.01); *G06F 2221/2101* (2013.01); *H04L 63/1416* (2013.01); *H04L 63/168* (2013.01)

(56) References Cited

U.S. PATENT DOCUMENTS

| | | | |
|---|---|---|---|
| 2007/0234415 | A1 | 10/2007 | Zaninotti |
| 2010/0169974 | A1* | 7/2010 | Calendino ........... H04L 63/1433 726/25 |
| 2010/0251365 | A1 | 9/2010 | Lyne et al. |
| 2010/0293616 | A1 | 11/2010 | Young |
| 2011/0161486 | A1* | 6/2011 | Podjarny ............. G06F 11/3676 709/224 |
| 2011/0197176 | A1 | 8/2011 | Muharsky et al. |
| 2011/0307954 | A1 | 12/2011 | Melnik et al. |
| 2012/0030516 | A1 | 2/2012 | De Keukelaere et al. |
| 2012/0072968 | A1* | 3/2012 | Wysopal ............. G06F 11/3612 726/1 |
| 2012/0174228 | A1 | 7/2012 | Giakouminakis et al. |
| 2012/0246487 | A1 | 9/2012 | Gu et al. |
| 2012/0260344 | A1 | 10/2012 | Maor et al. |
| 2013/0312102 | A1* | 11/2013 | Brake ................... G06F 21/577 726/25 |
| 2014/0129620 | A1* | 5/2014 | Saltzman ............ H04L 67/2804 709/203 |

FOREIGN PATENT DOCUMENTS

| | | |
|---|---|---|
| CN | 102147764 | 8/2011 |
| CN | 102598017 | 7/2012 |
| CN | 102622558 | 8/2012 |
| CN | 102750469 | 10/2012 |
| CN | 102810078 | 12/2012 |
| CN | 102945203 | 2/2013 |

OTHER PUBLICATIONS

J.C. Huang, "An Approach to Program Testing," Sep. 1975, pp. 1-16, Computing Surveys, vol. 7, No. 3, Association for Computing Machinery, Inc.

Auger, R., Web Application Security Scanner Evaluation Criteria Version 1.0, Web Application Security Consortium, 2009, 26 pages.

International Search Report and Written Opinion, dated Nov. 27, 2013, PCT Patent Application No. PCT/US2013/028403, 9 pages.

Zhao, Xiaodong, Summary of "Research and Implementation of Virtualization-Based Malicious Code Analysis Tools," Chinese Master's Theses Full-Text Database, Oct. 2012, 14 pages.

Yao et al., English Abstract on "Design and implementation of coverage evaluating system of binary code", Computer Engineering and Design, Dec. 31, 2010, 4 pages.

Ruoyu Zhang, "Static Code Analysis Assisted Dynamic Error Detection," Chinese Master's Theses Full-Text Database—Information Science and Technology, vol. 3, Mar. 2012, 19 pp.

Shi et al., English Abstract on "Source Code Vulnerability Detection Using Information Flow Analysis", Dec. 31, 2011, 3 pages.

Xu et al., English Abstract on "Design and realization of a block coverage testing tool", Dec. 31, 2008, 5 pages.

* cited by examiner

DETERMINING COVERAGE OF DYNAMIC SECURITY SCANS USING RUNTIME AND STATIC CODE ANALYSES

BACKGROUND

Dynamic security scans are performed to identify security vulnerabilities of web applications. For example, a dynamic security scan may determine the type and quantity of vulnerabilities, the locations of the vulnerabilities, and steps to reproduce the vulnerabilities. Typically, dynamic security scans are performed as black-box tests that do not have access to the source code. In this case, the dynamic security scans identify the security vulnerabilities by performing actual attacks on the web applications.

BRIEF DESCRIPTION OF THE DRAWINGS

The following detailed description references the drawings, wherein.

DETAILED DESCRIPTION

As discussed above, dynamic security scans are performed on web applications to identify security vulnerabilities. For example, a dynamic security scan may identify security vulnerabilities by performing actual attacks such as a buffer overflow attack or a structured query language (SQL) injection attack on a web application and recording the results. However, dynamic security scans are black-box testing procedures that have no knowledge of the underlying source code of the web applications. Accordingly, the effectiveness of a dynamic security scan is typically determined based on the speed of the scan and the number of vulnerabilities that are identified.

The typical determinations of effectiveness may not objectively assess a dynamic security scan because the number of vulnerabilities identified may depend more on the quality of the web application rather than the quality of the scan. For example, a high quality web application may have few security vulnerabilities to identify in a scan, which would normally result in a dynamic security scan being identified as a poor quality scan. Similarly, a low quality web application may have an overabundance of security vulnerabilities to identify in a scan, which could allow for a poor quality scan to appear to be highly effective even if it was only able to identify a small portion of the vulnerabilities.

Example embodiments disclosed herein determine coverage of dynamic security scans using runtime analysis and static code analysis. For example, in some embodiments, a system performs static code analysis of a web application to identify data entry points of the web application's source code, where the data entry points are used to determine an attack surface size of the web application. At this stage, the system may initiate runtime monitoring for a dynamic security scan of an execution of the web application. When a statement at one of the data entry points is invoked, the runtime monitoring may detect and log the invocation as an invocation entry that includes invocation parameters and a timestamp. Based on the invocation entries and the attack surface size, the attack surface coverage of the dynamic security scan may be determined to assess the quality of the scan.

In this manner, example embodiments disclosed herein allow dynamic security scans to be objectively assessed based on the portion of the attack surface covered by the scan. Specifically, by performing a combined runtime analysis and static code analysis of the source code of the web application, the size of the attack surface may be determined and then used to determine the attack surface coverage. The attack surface coverage allows the user to determine whether the web application is actually free of security vulnerabilities and whether the dynamic security scan is properly configured.

Figure 1:
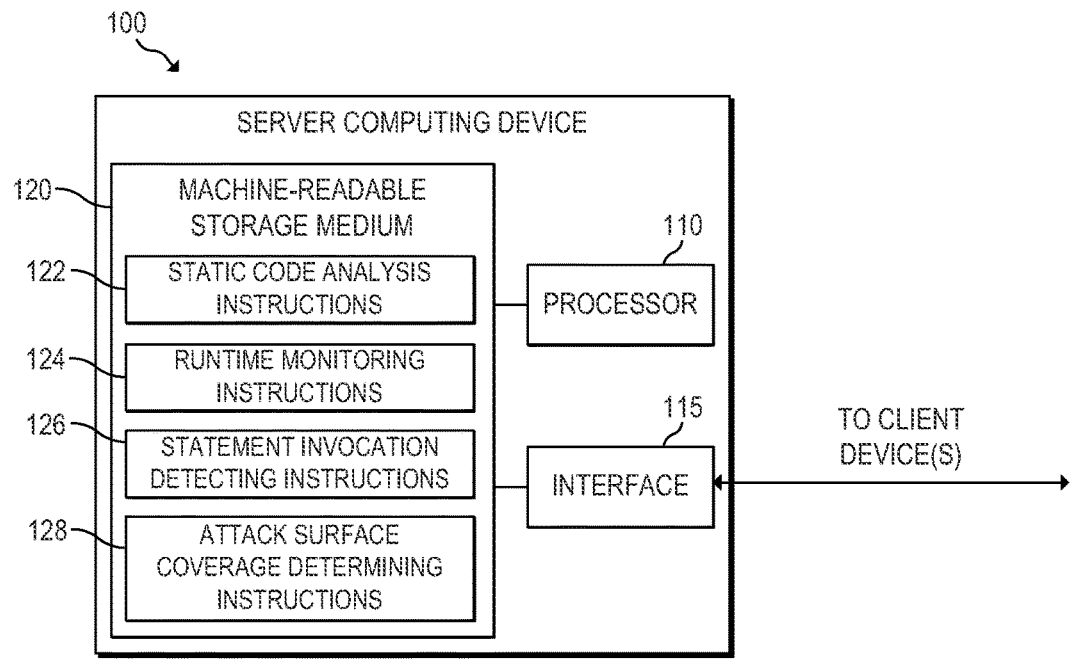
FIG. 1 is a block diagram of an example system for determining coverage of dynamic security scans using runtime and static code analyses.

Referring now to the drawings, FIG. 1 is a block diagram of an example system for determining coverage of dynamic security scans using runtime analysis and static code analysis. The example system can be implemented as a server computing device 100 such as a rack server, a notebook computer, a desktop computer, an all-in-one system, a tablet computing device, or any other electronic device suitable for determining coverage of dynamic security scans. In the embodiment of FIG. 1, server computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable determining coverage of dynamic security scans using runtime analysis and static code analysis. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with client device(s). For example, interface 115 may be an Ethernet interface, a Universal Serial Bus (USB) interface, an IEEE 1394 (FireWire) interface, an external Serial Advanced Technology Attachment (eSATA) interface, or any other physical connection interface suitable for communication with a client device. Alternatively, interface 115 may be a wireless interface, such as a wireless local area network (WLAN) interface or a near-field communication (NFC) interface. In operation, as detailed below, interface 115 may be used to send and receive data, such as web application data, to and from a corresponding interface of a client device.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for determining coverage of dynamic security scans using runtime analysis and static code analysis.

Static code analysis instructions 122 may perform static code analysis on source code of a web application. Specifically, static code analysis may be performed on the source code to identify data entry points of the web application and to categorize portions of the source code as reachable or unreachable. Examples of data entry points of the web application may include, but are not limited to, uniform resource locator (URL) parameters, hypertext markup language (HTML) parameters, client-side scripting parameters, and web service interfaces. In some cases, the data entry points may be identified based on key words in the source code, where the key words vary according to the programming language of the source code. In other cases, the data entry points may be identified based on metadata in, for example, an extensible markup language (XML) message that describes the expected parameters and output. The size of the attack surface of the web application may be determined based on the total number of data entry points of the web application. In other words, the attack surface of a web application may be formed by the data entry points of the web application.

Reachable code may include portions of the source code of the web application that are reachable from the client-side. Client-side may refer to any operation executing on a client device interacting with the server computing device 100. In this case, source code of the web application is reachable from the client-side if the source code can be invoked in response to a client-side operation originating from the client device. Server-side may refer to any operation executing on the server computing device 100. Unreachable code may include portions of the source code that are completely unreachable from the client-side. In other words, unreachable code is not invoked in response to any of the data entry points accessible from the client-side.

A web application may be an application or service provided by the server computing device 100 to client devices over a network (e.g., Internet, Intranet, etc.) via the interface 115. For example, a web application may be executed by a web server executing on the server computing device 100 to provide web pages to a web browser of a client device. In another example, a web application may be a web service that provides functionality in response to requests from a client device over a network.

Runtime monitoring instructions 124 may initiate runtime monitoring of an executing web application during a dynamic security scan. Specifically, runtime monitoring instructions 124 may be configured with operating parameters that are used to initiate monitoring of the dynamic security scan. For example, the operating parameters may include a time and duration for the runtime monitoring, a process associated with the dynamic security scan, an Internet protocol (IP) address from which the dynamic security scan will originate, etc. In some cases, the runtime monitoring may monitor the data entry points identified by the static code analysis instructions 122 as discussed above.

Statement invocation detecting instructions 126 may detect and log invocations of the web application received from the dynamic security scan. Specifically, the statement invocation detecting instructions 126 may log invocation parameters and corresponding values received by the server computing device 100 for the web application in response to invocation of a statement that originates from the dynamic security scan. For example, when invocation parameters are received for the web application at a data entry point, an invocation log entry may be created that includes the invocation parameters, corresponding values, and a timestamp. A statement of source code may correspond to the smallest functional element of a programming language (e.g., a line of source code).

Attack surface coverage determining instructions 128 may determine the attack surface coverage of a completed dynamic security scan. Initially, the attack surface coverage determining instructions 128 may use invocation log entries to determine which of the data entry points were used during the dynamic security scan. At this stage, the attack surface coverage may be determined as the proportion of data entry points that were used during the dynamic security scan. For example, if three quarters of the data entry points was used, the dynamic security scan would have an attack surface coverage of seventy-five percent.

Figure 2:
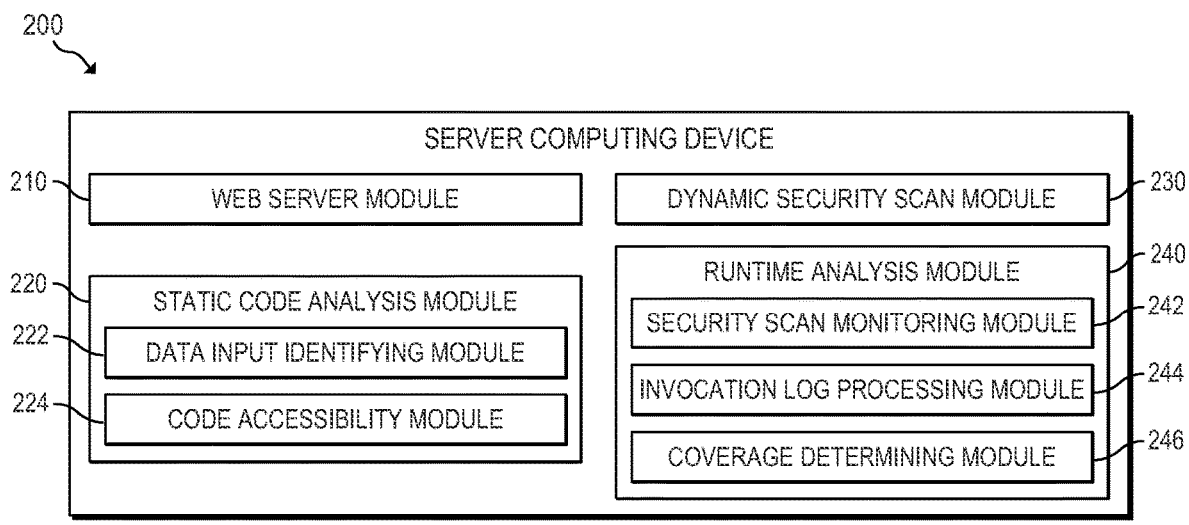
FIG. 2 is a block diagram of an example server computing device including modules for performing aspects of determining coverage of dynamic security scans using runtime and static code analyses.

FIG. 2 is a block diagram of an example server computing device 200 including modules for performing aspects of determining coverage of dynamic security scans using runtime and static code analyses. As with server computing device 100 of FIG. 1, server computing device 200 may be any electronic device suitable for assessing dynamic security scans.

Web server module 210 may be a web server software application configured to provide a web application to client devices. The web application may be provided as web pages or web services over a network. The web server module 210 may provide the web application based on source code (e.g., HTML files, script files, etc.) or object code (e.g., linked libraries, shared objects, executable files, etc.) generated from source code. For example, the web server module 210 may provide web pages based on HTML files, which may include embedded scripts that are executed by the web server module 210 to generate dynamic content for the client devices. In another example, the web server module 210 may expose an interface to a web service that triggers execution of a function in a linked library in response to receiving a request from a client device.

As illustrated in FIG. 2 and described in detail below, computing device 200 may also include a number of modules 220-246. Each of the modules may include a series of instructions encoded on a machine-readable storage medium and executable by a processor of computing device 200. In addition or as an alternative, each module 220-246 may include one or more hardware devices comprising electronic circuitry for implementing the functionality described below. In some cases, the modules 220-246 may be implemented as a distributed system across multiple computing devices.

Static code analysis module 220 may perform static code analysis on source code of a web application provided by the web server module 210. Although the components of static code analysis module 220 are described in detail below, additional details regarding an example implementation of static code analysis module 220 are provided above with respect to static code analysis instructions 122 of FIG. 1.

Source code may be a collection of human-readable, computer instructions. Example of source code files include, but are not limited to, HTML files, configurations files, dynamic script files, and various programming language files. Data input identifying module 222 may analyze source code of a web application to identify data entry points. The data entry points may then be used to determine a size of an attack surface of the web application. In some cases, different combinations of data entry points may be considered as distinct inputs in the attack surface of a web application. For example, different URL parameters may be combined to generate distinct inputs in the attack surface.

Code accessibility module 224 may categorize portions of source code as either reachable or unreachable from the client-side. For example, a data flow analysis using the data entry points identified by the data input identifying module 222 may be performed to identify reachable portions of the source code. In this example, the data flow analysis may determine (1) where values assigned to a variable originate; (2) possible values of a variable; and/or (3) locations into which an expression, variable, or parameter can flow. Portions of code that are not identified as flowing into or from invocation parameters received at the data entry points may be identified as unreachable. In some cases, a confidence value may be assigned to each portion of code identified as reachable from the client-side, where the confidence value corresponds to the probability that the portion is actually reachable. In this case, a confidence threshold may be configured such that portions with confidence values falling below the threshold are disregarded when determining reachable code coverage.

Dynamic security scan module 230 may perform dynamic security scans of executing web applications. Specifically, dynamic security scan module 230 may perform actual attacks on an executing web application to identify security vulnerabilities. Dynamic security scan module 230 may be configured to perform a routine of attacks based on the source code of the web application, use cases determined by testers of the web application, and/or configurations of the web application and/or the web server module 210. Examples of security vulnerabilities identified by a dynamic security scan include, but are not limited to, SQL injection, buffer overflow exploits, cross-site scripting, and denial of service.

Runtime analysis module 240 may perform runtime monitoring of dynamic security scans using the results of static code analyses performed by the static code analysis module 220. Although the components of runtime analysis module 240 are described in detail below, additional details regarding an example implementation of runtime analysis module 240 are provided above with respect to runtime monitoring instructions 124, statement invocation detecting instructions 126, and attack surface coverage determining instructions 128 of FIG. 1.

Security scan monitoring module 242 may perform runtime monitoring of dynamic security scans. Specifically, security scan monitoring module 242 may monitor a dynamic security scan for client-side invocations of the web application. In response to detecting an invocation, security scan monitoring module 242 may generating an invocation log entry that includes the data entry points accessed, any invocation parameters and values passed from the dynamic security scan for the invocation, and a timestamp.

Invocation log processing module 244 may process the invocation log generated by the security scan module. For example, the invocation log entries may be used to determine the code units (e.g., classes, functions, basic blocks, statements, or paths of source code) of reachable code that were accessed in response to invocations originating from the dynamic security scan. In another example, the invocation log entries may be used to determine the data entry inputs that were used during the dynamic security scan. In some cases, security scan monitoring module 242 may use invocation log processing module 244 to track the code units of reachable code that are accessed in real time as the dynamic security scan is being performed. Alternatively, the invocation log processing module 244 may process the invocation log entries after the dynamic security scan is complete.

Coverage determining module 246 may determine coverages for a dynamic security scan of a web application based on the results of static code analysis performed by static code analysis module 220 and invocation log entries processed by invocation log processing module 244. The coverages determined by the coverage determining module 246 may include reachable code coverage, attack surface coverage, and combined coverage. Reachable code coverage may be determined as the proportion of reachable code that is accessed in response to client-side invocations during a dynamic security scan. For example, if half of the reachable code was accessed, the dynamic security scan would have a reachable code coverage of fifty percent. Further, because the unreachable portions of code categorized by the static code analysis module 220 are disregarded, the reachable code coverage more accurately reflects the extensiveness of the dynamic security scan. Attack surface coverage may be determined as the proportion of data entry points that are used during a dynamic security scan.

Combined coverage may be a combination of reachable code coverage and attack surface coverage of a dynamic security scan. For example, the combined coverage may be a summation of the reachable code coverage and the attack surface coverage. In another example, the combined coverage may be a weighted average of the reachable code coverage and the attack surface coverage. Coverage determining module 246 may provide the coverages to a user for assessing the effectiveness of a dynamic security scan. For example, if a low combined coverage is provided to the user, the user may reconfigure the dynamic security scan to increase the combined coverage for the next scan.

Figure 3:
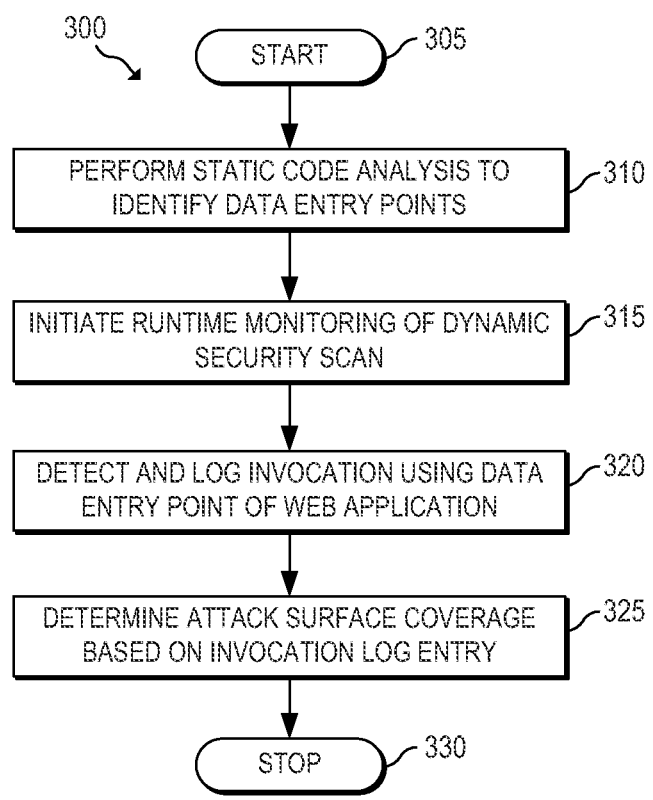
FIG. 3 is a flowchart of an example method for execution by a server computing device for determining coverage of dynamic security scans using runtime and static code analyses.

FIG. 3 is a flowchart of an example method 300 for execution by a server computing device 100 for determining coverage of dynamic security scans using runtime and static code analyses. Although execution of method 300 is described below with reference to server computing device 100 of FIG. 1, other suitable devices for execution of method 300 may be used, such as server computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where server computing device 100 may perform static code analysis to identify data entry points of a web application. Specifically, static code analysis may be performed on source code of the web application to identify data entry points based on key words in the source code and/or associated configuration files. Next, in block 315, runtime monitoring is initiated for a dynamic security scan. For example, server computing device 100 may initiate runtime monitoring in response to detecting execution of the dynamic security scan. In another example, runtime monitoring may be initiated manually by a user prior to the execution of the dynamic security scan. The runtime monitoring monitors the dynamic security scan for invocations of the web application through the data entry points In block 320, server computing device 100 may detect and log an invocation of a source code statement of the web application by the dynamic security scan. For example, an invocation may be detected at a data entry point identified in block 310 and logged as an invocation log entry that includes the data entry point, any invocation parameters and their values, and a timestamp. Next, in block 325, attack surface coverage of the dynamic security scan may be determined using the invocation log entry. For example, the attack surface coverage may be determined as the proportion of data entry points that were used during the dynamic security scan. Method 300 may subsequently proceed to block 330, where method 300 may stop.

Figure 4:
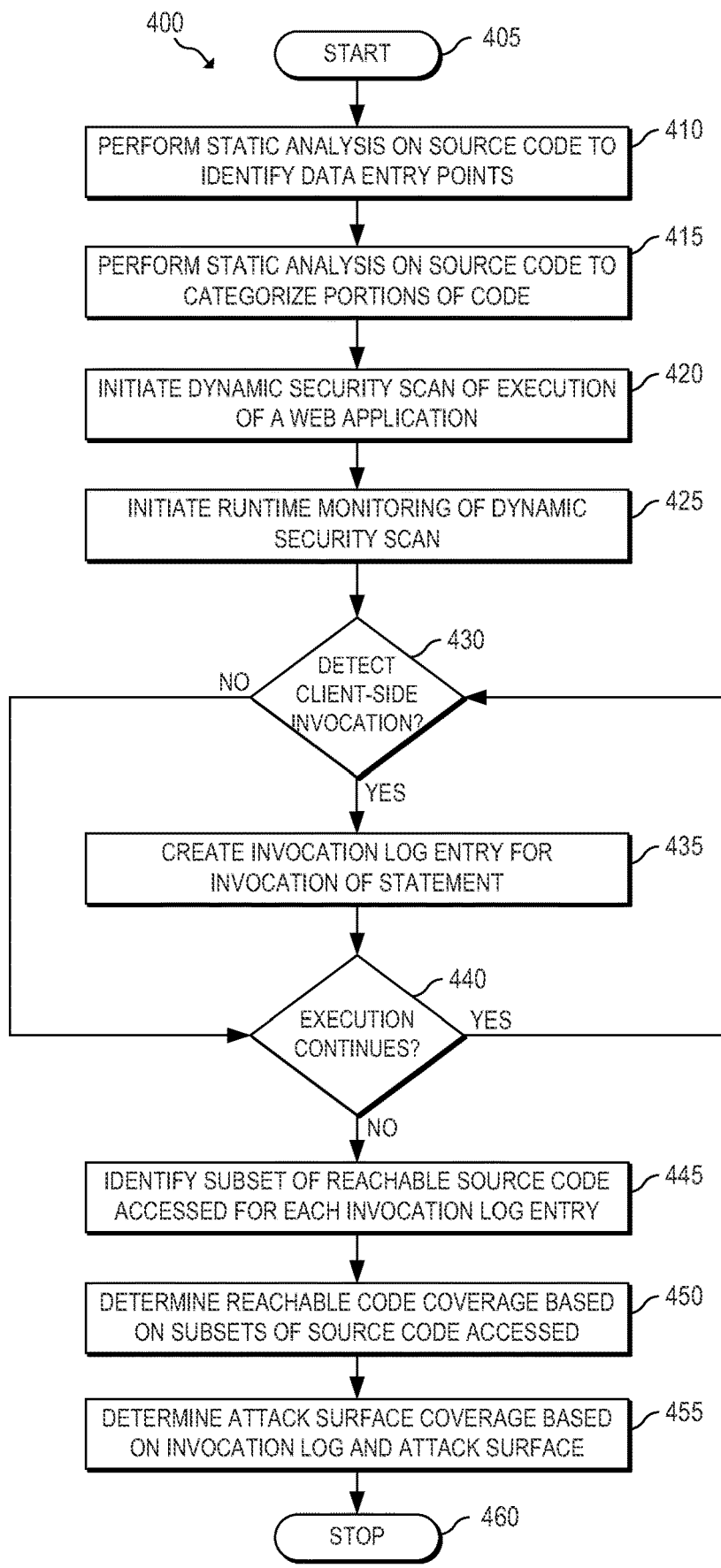
FIG. 4 is a flowchart of an example method for execution by a server computing device for providing iterative determination of coverage for dynamic security scans using runtime and static code analyses.

FIG. 4 is a flowchart of an example method 400 for execution by a server computing device 200 for providing iterative determination of coverage for dynamic security scans using runtime and static code analyses. Although execution of method 400 is described below with reference to server computing device 200 of FIG. 2, other suitable devices for execution of method 400 may be used, such as server computing device 100 of FIG. 1. Method 400 may be implemented in the form of executable instructions stored on a machine-readable storage medium and/or in the form of electronic circuitry.

Method 400 may start in block 405 and proceed to block 410, where server computing device 200 may perform static analysis on source code of a web application to identify data entry points. Next, in block 415, the static analysis may continue to categorize portions of the source code as reachable or unreachable from the client-side.

In block 420, a dynamic security scan is initiated for an execution of a web application. For example, the web application may be provided by a web server, and the dynamic security scan may be performed by a client device accessing the web application. Next, in block 425, runtime monitoring of the dynamic security scan is initiated. The runtime monitoring may monitor the data entry points identified in block 410 to detect invocations of a source code statement of the web application from the dynamic security scan in block 430.

If an invocation is detected, server computing device 200 creates an invocation log entry for the invocation that includes the data entry points used, any invocation parameters and their values, and a timestamp in block 435. Further, the invocation log entry may also include the code units (e.g., classes, functions, basic blocks, statements, or paths of source code) that were executed in response to the invocation. Next, in block 440, a determination is made as to whether execution of the dynamic security scan continues. If the execution of the dynamic security scan does continue, method 400 returns to block 430. In block 430, if a client-side invocation is not detected, method 400 proceeds to block 440.

If execution of the dynamic security scan does not continue, method proceeds to block 445, where code units (e.g., classes, functions, basic blocks, statements, or paths of source code) of the reachable source code that were accessed during each invocation are identified using a corresponding invocation log entry. Next, in block 450, reachable code coverage for the dynamic security scan is determined using the code units as the proportion of reachable code that was accessed during the dynamic security scan. The unreachable code is disregarded when making this determination, which allows for a more accurate assessment of code coverage.

In block 455, attack surface coverage is determined as the proportion of data entry points used during the dynamic security scan. The attach surface coverage may also account for different combinations of data entry points in the case of, for example, URL parameters that may be included in the same URL query string. Method 400 may subsequently proceed to block 460, where method 400 may stop.

Figure 5:
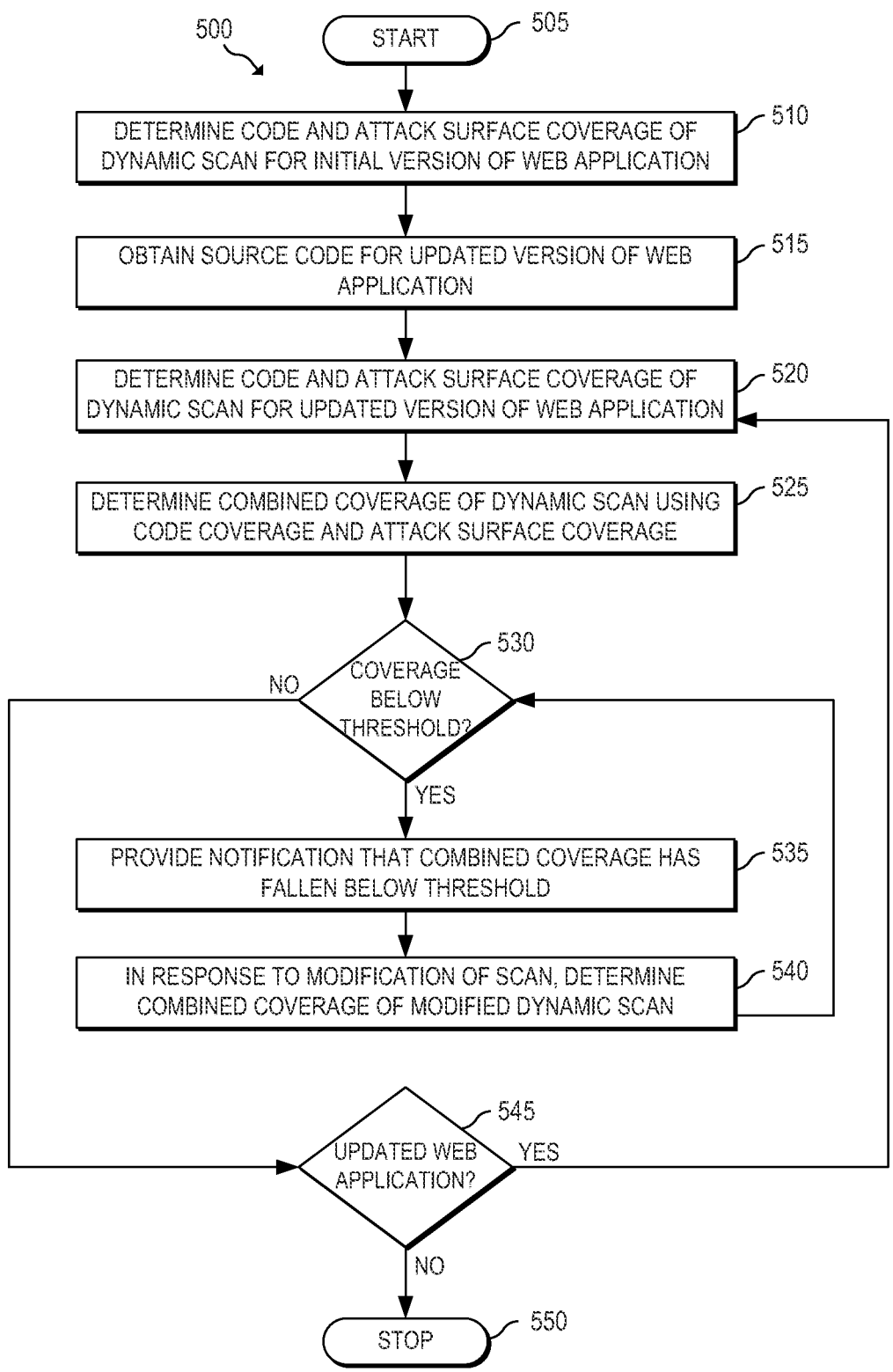
FIG. 5 is a flowchart of an example method for execution by a server computing device for determining coverage of dynamic security scans on multiple versions of a web application using runtime and static code analyses.

FIG. 5 is a flowchart of an example method 500 for execution by a server computing device 200 for determining coverage of dynamic security scans using runtime and static code analyses across multiple versions of a web application. Although execution of method 500 is described below with reference to server computing device 200 of FIG. 2, other suitable devices for execution of method 500 may be used, such as server computing device 100 of FIG. 1. Method 500 may be implemented in the form of executable instructions stored on a machine-readable storage medium and/or in the form of electronic circuitry.

Method 500 may start in block 505 and proceed to block 510, where server computing device 200 may determine reachable code coverage and attack surface coverage of a dynamic security scan that was performed on an initial version of a web application. The coverages may be determined as described above with respect to FIG. 4. Next, in block 515, source code for an updated version of the web application is obtained. The updated version of the web application may include enhancements and defect fixes that were not included in the initial version.

In block 520, reachable code coverage and attack surface coverage may be determined for a new dynamic security scan that was performed on the updated version of the web application. The updated version of the web application may be compiled from the updated source code obtained in block 515. Next, in block 525, a combined coverage for the new dynamic security scan is determined using the reachable code coverage and the attack surface coverage. For example, the combined coverage may be a simple summation, a weighted average, etc. of the reachable code coverage and the attack surface coverage.

In block 530, it is determined if the combined coverage is below a preconfigured threshold. For example, the preconfigured threshold may be configured by a user based on the expected quality of the dynamic security scan (i.e., a higher preconfigured threshold corresponds to a higher quality dynamic security scan). In another example, the preconfigured threshold may be determined based on the combined coverage of a previous version of the web application or a previous configuration of the dynamic security scan. In this example, the preconfigured threshold may ensure that the quality of the dynamic security scan does not decrease as updated versions of the web application or the dynamic security scan are created. If the combined coverage is below the preconfigured threshold, a notification that the dynamic security scan has fallen below the threshold is provided to the user in block 535.

In response to the user modifying the configuration of the dynamic security scan, server computing device 200 may determine the combined coverage of the modified dynamic security scan that was on the updated version of the web application in block 540. The user may modify the dynamic security scan by modifying the data entry inputs used during the scan, changing the range of values used for invocation parameters passed through the data entry inputs, etc. Method 500 may then return to block 530, where it is determined whether the combined coverage of the modified dynamic security scan exceeds the preconfigured threshold.

If the combined coverage is not below the preconfigured threshold, it is determined if there is a further updated version of the web application in block 545. If there is a further updated version of the web application, method 500 returns to block 520 and proceeds as described above. If there is no further updated version of the web application, method 500 may proceed to block 550, where method 500 may stop.

Figure 6A:
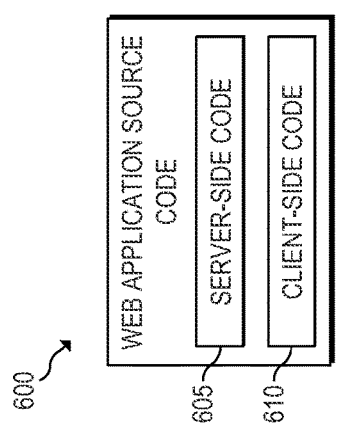
FIGS. 6A-6D are block diagrams of example source code at various stages of determining coverage of a dynamic security scan using runtime and static code analyses.

FIGS. 6A-6D are block diagrams of example source code at various stages of determining coverage of dynamic security scans using runtime and static code analyses. FIG. 6A depicts source code 600 of a web application, where the source code 600 includes server-side code 605 and client-side code 610. Server-side code 605 may include code executed on a web server providing the web application. Client-side code 610 may include code that is transmitted by the web server to a client device, which then executes the client-side code.

Figure 6B:
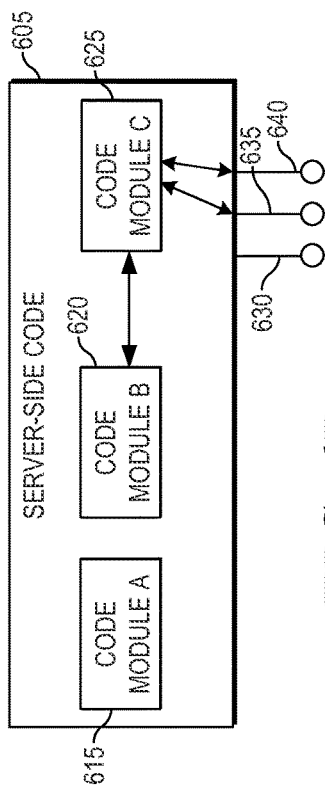

FIG. 6B depicts server-side code 605 including code module A 615, code module B 620, and code module C 625. Each of the code modules may correspond to a function, a script, a dynamic web page, etc. In this example, code module C 625 interacts (e.g., calls functions, accesses parameters, etc.) with code module B 620. Server-side code 605 also includes data entry points 630, 635, 640. Data entry points 635, 640 provide client devices with access to code module C 625. Data entry point 630 provides access to a different code module (not shown) in the server-side code 605.

Figure 6C:
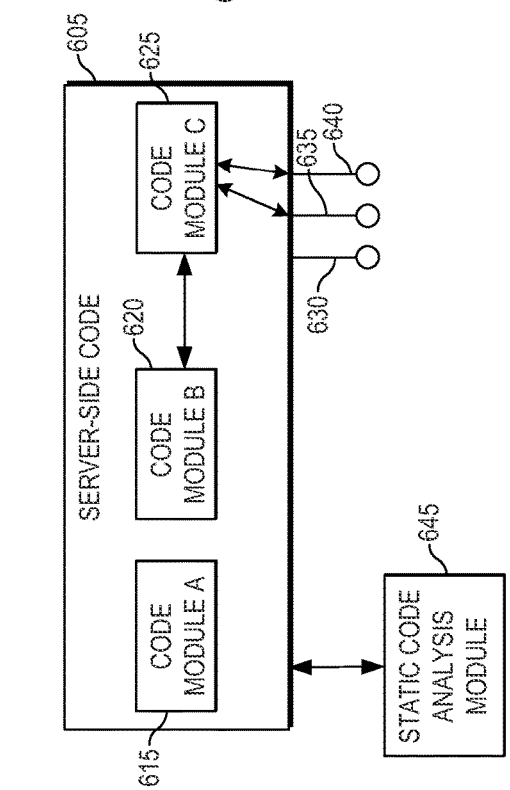

FIG. 6C depicts static code analysis module 645 interacting with server-side code 605. Static code analysis module 645 may perform static code analysis to categorize each of the code modules (e.g., code module A 615, code module B 620, code module C 625) as reachable or unreachable from the client-side. In this example, code module A 615 is categorized as unreachable, and code module B 620 and code module C 625 are categorized as reachable. Further, the static code analysis may identify data entry points 630, 635, 640 based on the server-side code 605.

Figure 6D:
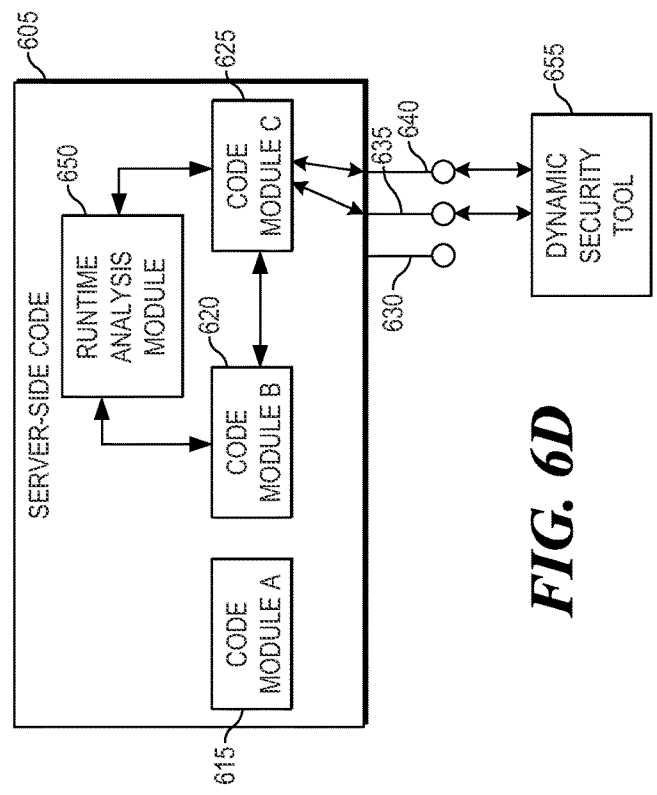

FIG. 6D depicts runtime analysis module 650 and dynamic security tool 655 interacting with server-side code 605. Runtime analysis module 650 may perform runtime analysis to detect invocations of statements in server-side code 605. Specifically, runtime analysis module 650 may monitor data entry points 630, 635, 640 to detect invocations originating from dynamic security tool 655. Dynamic security tool 655 may perform a dynamic security scan of the server side code 605. In this example, the dynamic security tool 655 uses two data entry points 635 and 640 to invoke statements in the server-side code 605. Accordingly, the attack surface coverage may be determined to be sixty-six percent because three data entry points 630, 635, and 640 are available for use. Further, if the invocations from dynamic security tool 655 trigger execution in code module C 625, the reachable code coverage may be determined to be fifty percent because two modules (code module B 620, code module C 625) are reachable from the client-side.

The foregoing disclosure describes a number of example embodiments for determining coverage of dynamic security scans using runtime and static code analyses. In this manner, the embodiments disclosed herein enable more accurate assessments of dynamic security scans to be performed by initially performing static code analysis to determine the potential extent of the coverage and then performing runtime analysis to assess the coverage of the scan in view of the potential extent.

We claim:

1. A system comprising:
a processor to:
perform a static code analysis of a web application to identify a plurality of data entry points for the web application, wherein the plurality of data entry points are used to determine an attack surface size for the web application, and the static code analysis of the web application identifies a reachable portion of source code of the web application;
initiate runtime monitoring for a dynamic security scan of the web application;
detect, by the runtime monitoring, invocation of a statement at one of the plurality of data entry points, wherein the invocation is logged as an invocation entry that comprises invocation parameters, a timestamp, and code units of the reachable portion of the source code that were accessed in response to the invocation of the statement;
determine an attack surface coverage of the dynamic security scan using the invocation entry and the attack surface size; and
determine a reachable code coverage of the dynamic security scan using the code units and the reachable portion of the source code.

2. The system of claim 1, wherein the processor is further to:
use the reachable code coverage and the attack surface coverage to determine a combined coverage; and
in response to determining that the combined coverage has fallen below a preconfigured threshold, generate a notification recommending that the dynamic security scan be reconfigured to increase the combined coverage.

3. The system of claim 1, wherein the processor is further to:
use the reachable code coverage and the attack surface coverage to determine a first combined coverage;
in response to receiving updated source code of the web application, determine a second combined coverage using the updated source code; and
in response to determining that the second combined coverage is less than the first combined coverage, generate a notification recommending that the dynamic security scan be reconfigured based on the updated source code.

4. The system of claim 1, wherein the processor is further to:
track the code units.

5. The system of claim 1, wherein the static code analysis of the web application further identifies an unreachable portion of the source code, and wherein the unreachable portion is disregarded when determining the reachable code coverage.

6. The system of claim 1, wherein the processor uses a result of the static code analysis to detect the invocation of the statement.

7. The system of claim 1, wherein the processor identifies the one of the plurality of data entry points in the static code analysis based on a key word of source code of the web application.

8. The system of claim 1, wherein the processor identifies the one of the plurality of data entry points in the static code analysis based on a configuration file associated with source code of the web application.

9. A non-transitory machine-readable storage medium encoded with instructions that, when executed by a processor, cause the processor to:
perform static code analysis of a web application to identify a reachable portion of source code of the web application, wherein the reachable portion of the source code is accessible from a client-side;
detect runtime monitoring for a dynamic security scan of the web application;

detect, by the runtime monitoring, invocation of a statement in the reachable portion of the source code, wherein the invocation is logged as an invocation entry that comprises a timestamp and code units of the reachable portion of the source code that were accessed in response to the invocation of the statement; and detect a reachable code coverage of the dynamic security scan using the code units and the reachable portion of the source code.

10. The machine-readable storage medium of claim 9, wherein the instructions, when executed by the processor, further cause the processor to identify a plurality of data entry points for the web application, wherein the invocation entry further comprises invocation parameters, and wherein the machine-readable storage medium further stores instructions that, when executed by the processor, cause the processor to:

use the plurality of data entry points to determine an attack surface size for the web application; and determine an attack surface coverage of the dynamic security scan using the invocation entry and the attack surface size.

11. The machine-readable storage medium of claim 9, wherein the instructions, when executed by the processor, further cause the processor to identify an unreachable portion of the source code, and wherein the unreachable portion is disregarded when determining the reachable code coverage.

12. The machine-readable storage medium of claim 10, wherein the machine-readable storage medium further stores instructions that, when executed by the processor, cause the processor to:

use the reachable code coverage and the attack surface coverage to determine a combined coverage; and generate, in response to determining that the combined coverage has fallen below a preconfigured threshold, a notification recommending that the dynamic security scan be reconfigured to increase the combined coverage.

13. The machine-readable storage medium of claim 10, wherein the machine-readable storage medium further stores instructions that, when executed by the processor, cause the processor to:

use the reachable code coverage and the attack surface coverage to determine a first combined coverage;

determine, in response to receiving updated source code of the web application, a second combined coverage using the updated source code; and generate, in response to determining that the second combined coverage is less than the first combined coverage, a notification recommending that the dynamic security scan be reconfigured based on the updated source code.

14. A method comprising:

performing, by a computing device, a static code analysis of a web application to identify a plurality of data entry points for the web application and a reachable portion of source code of the web application, wherein the plurality of data entry points are used to determine an attack surface size for the web application;

initiating runtime monitoring for a dynamic security scan of the web application;

detecting, by the runtime monitoring, invocation of a statement at one of the plurality of data entry points, wherein the invocation is logged as an invocation entry that comprises invocation parameters, a timestamp, and code units of the reachable portion of the source code that were accessed in response to the invocation of the statement; and determining combined coverage of the dynamic security scan using the invocation entry, the attack surface size, and the reachable portion of source code.

15. The method of claim 14, further comprising:

in response to determining that the combined coverage has fallen below a preconfigured threshold, generating a notification recommending that the dynamic security scan be reconfigured to increase the combined coverage.

16. The method of claim 14, further comprising:

in response to receiving updated source code of the web application, determine an updated combined coverage using the updated source code; and in response to determining that the updated combined coverage is less than the combined coverage, generate a notification recommending that the dynamic security scan be reconfigured based on the updated source code.

17. The method of claim 14, wherein the static code analysis of the web application further identifies an unreachable portion of the source code, and wherein the unreachable portion is disregarded when determining the combined coverage.

* * * * *